United States Patent
Akiyama

(10) Patent No.: US 7,745,036 B2
(45) Date of Patent: Jun. 29, 2010

(54) DIRECT OXIDATION FUEL CELL SYSTEM AND MEMBRANE ELECTRODE ASSEMBLY THEREOF

(75) Inventor: Takashi Akiyama, Suita (JP)

(73) Assignee: Panasonic Corporation, Osaka (JP)

(*) Notice: Subject to any disclaimer, the term of this patent is extended or adjusted under 35 U.S.C. 154(b) by 1266 days.

(21) Appl. No.: 11/270,596

(22) Filed: Nov. 10, 2005

(65) Prior Publication Data

US 2007/0105004 A1    May 10, 2007

(51) Int. Cl.
*H01M 4/00*    (2006.01)
*H01M 8/00*    (2006.01)
*H01M 8/10*    (2006.01)

(52) U.S. Cl. .............................. 429/40; 429/42; 429/27; 429/12; 429/30

(58) Field of Classification Search .................... 429/40, 429/42
See application file for complete search history.

(56) References Cited

U.S. PATENT DOCUMENTS 5,573,866 A * 11/1996 Van Dine et al. ............... 429/13
5,882,810 A * 3/1999 Mussell et al. ................ 429/33
2006/0083971 A1 * 4/2006 DeSimone et al. ............ 429/30

FOREIGN PATENT DOCUMENTS

JP    09-213350    8/1997

* cited by examiner

*Primary Examiner*—Patrick Ryan
*Assistant Examiner*—Helen O Conley
(74) *Attorney, Agent, or Firm*—McDermott Will & Emery LLP

(57) ABSTRACT

A membrane electrode assembly for a direct oxidation fuel cell includes a proton-conductive electrolyte membrane and an anode and a cathode sandwiching the electrolyte membrane. The equivalent weight of the proton-conductive substance contained in the catalyst layer of the anode is greater than the equivalent weight of the proton-conductive substance contained in the catalyst layer of the cathode. This invention reduces the performance deterioration caused by repetitive swelling and contraction of the electrolyte contained in the catalyst layer upon changes in operating conditions or upon repetitive start and stop of operation, thereby making it possible to provide a fuel cell with a high output and high performance.

5 Claims, 2 Drawing Sheets

DIRECT OXIDATION FUEL CELL SYSTEM AND MEMBRANE ELECTRODE ASSEMBLY THEREOF

FIELD OF THE INVENTION

The present invention relates to a direct oxidation fuel cell system that directly utilizes an organic fuel, and more particularly, to an electrode catalyst layer used therein.

BACKGROUND OF THE INVENTION

Fuel cells are roughly classified into phosphoric acid type, alkaline type, molten carbonate type, solid oxide type, and solid polymer type, according to the kind of the electrolyte they employ. Among them, solid polymer fuel cells (PEFCs), which are capable of operating at low temperatures and have high output densities, are becoming commercially practical in such applications as automobile power sources and domestic cogeneration systems.

Meanwhile, portable appliances, such as notebook personal computers, cellular phones and PDAs, have recently been becoming more and more sophisticated, and the electric power consumed thereby tends to increase commensurately. Such portable appliances are currently powered by lithium ion secondary batteries and nickel-metal hydride secondary batteries, but manufacturers of these batteries have failed to improve energy density so as to keep up with the recent increase in power consumption. Under such circumstances, a problem of capacity shortage of power sources is a matter of concern.

As a power source that can solve this problem, PEFCs have been receiving attention. Among them, direct oxidation fuel cells (DOFCs) can generate electric energy by directly oxidizing fuel at the electrode, without the need to reform fuel that is liquid at ordinary temperature into hydrogen. DOFCs are most promising in that they need no reformer and permit an easy reduction in the size of power sources.

With respect to the fuel to be fed to DOFCs, low-molecular-weight alcohols and ethers have been examined. Among them, methanol offers a high energy efficiency and a high output. Thus, direct methanol fuel cells (DMFCs), which use methanol as the fuel, are most promising.

The anodic and cathodic reactions of a DMFC are represented by the following formulae (1) and (2), respectively. Oxygen serving as the oxidant on the cathode is typically taken in from air.

$$CH_3OH+H_2O \rightarrow CO_2+6H^++6e^- \quad (1)$$

$$3/2O_2+6H^++6e^- \rightarrow 3H_2O \quad (2)$$

The protons produced on the anode migrate to the cathode through an electrolyte membrane, and a perfluorosulfonic acid film, typically Nafion (Nafion is a trademark of E.I. Du Pont de Nemours & Company), has been used as the electrolyte membrane in the same manner as in PEFCs.

The polymer constituting a perfluorosulfonic acid film is commonly composed of a carbon fluoride chain (main skeleton) and branched chains each having a sulfonic acid group at the terminal thereof. The sulfonic acid groups are strongly hydrophilic, while the carbon fluoride chain is strongly hydrophobic. Thus, it is considered that the perfluorosulfonic acid electrolyte undergoes a phase separation, thereby forming water clusters that are surrounded by hydrophilic sulfonic acid groups. Further, it is considered that when the perfluorosulfonic acid electrolyte is hydrated, many protons are dissociated from the strongly acid sulfonic acid groups, thereby exhibiting excellent proton conductivity.

On each side of the electrolyte membrane is usually formed a catalyst layer, which contains a catalytic substance. In order to ensure the proton conductivity inside the catalyst layer, the catalyst layer is commonly formed by mixing a solution containing perfluorosulfonic acid, which is the same component as that of the electrolyte membrane, with a catalytic substance, applying the mixture and drying it.

Commonly used indexes that indicate the amount of sulfonic acid groups in perfluorosulfonic acid polymer are ion exchange capacity and equivalent weight (hereinafter "EW values"). The former indicates the equivalent of sulfonic acid per unit dry resin weight, being expressed in a unit of, for example, mEq/g. The latter indicates the dry polymer weight per 1 equivalent of sulfonic acid groups, being expressed in g/Eq. The values of these two indexes are, as it were, reciprocal numbers. Although either of the two can be used, the EW values are used herein.

It should be noted that "EW values" and "ion exchange capacity" are applicable not only to perfluorosulfonic acid polymer, but also other ion exchange polymers composed mainly of a hydrocarbon and copolymers including an inorganic substance.

As the EW value is higher, the ratio of sulfonic acid groups in the polymer decreases and therefore the amount of proton dissociation decreases. Hence, the proton conductivity lowers and the resistance to ionic conduction in the catalyst layer increases, thereby leading to degradation in power generation performance.

On the other hand, if the amount of sulfonic acid groups is increased, i.e., if the EW value is lowered, the water-retaining ability of the polymer is enhanced. As a result, water produced at the cathode of the fuel cell accumulates inside the electrode, thereby interfering with the supply of oxygen (oxidant). This problem is known as "flooding".

In order to solve this problem, Japanese Laid-Open Patent Publication No. Hei 9-213350 proposes a technique associated with PEFCs that use hydrogen as the fuel. This document proposes that the ion exchange capacity of the ion exchange resin contained in the anode catalyst layer be greater than that of the ion exchange resin contained in the cathode catalyst layer. According to this proposal, the ionic conductivity of the anode is maintained at a high level while the flooding phenomenon of the cathode is prevented, so that PEFCs with a high current density and little deterioration in battery characteristics can be obtained.

Such proposal is considered to be effective for PEFCs that use hydrogen as the fuel. However, the present inventors have found that the technique disclosed in the above-mentioned document is not effective with respect to DOFCs, such as DMFCs, in which an organic fuel is directly supplied to the anode, in terms of obtaining an excellent long-term performance, because there are differences in the characteristics of deterioration of electrode performance between DOFCs and PEFCs. These differences are described below.

First, the deterioration of cathode performance due to the flooding phenomenon is described. In the same manner as PEFCs, DOFCs such as DMFCs also suffer from this problem. That is, water is produced at the cathode as represented by the formula (2), and there is an electro-osmotic drag of water by protons that move from the anode to the cathode (this water is hereinafter referred to as dragged water).

However, when PEFCs and DMFCs are compared, PEFCs can produce a dramatically higher voltage, and therefore PEFCs can operate at a larger current density than DMFCs in order to produce a higher output. In fact, while the above-mentioned document states that the initial current density of the PEFC is approximately 0.9 A/cm², the current density of DMFCs is 0.3 A/cm² at maximum, preferably approximately 0.2 A/cm².

In an electrochemical reaction, by Faraday's law, the amount of products is proportional to the current generated, and the amount of electro-osmotic drag of water is proportional to the amount of proton migration, i.e., current. Therefore, both the amount of water produced at the cathode and the amount of dragged water are proportional to the current, i.e., current density. This indicates that the amount of water causing cathode flooding in a DMFC is approximately ⅓ of the amount in a PEFC.

Next, the performance deterioration upon a long-term operation is described. The present inventors have found that DOFCs such as DMFCs exhibit a performance deterioration phenomenon upon a long-term operation, but this phenomenon does not remarkably occur in PEFCs.

Electrolytes capable of conducting protons at low temperatures, such as perfluorosulfonic acid, exhibit high proton conductivity when they absorb water and a proton conductive path is formed by the water. However, upon absorption of water, these ion exchange resins usually swell depending on the amount of water absorbed until the water content reaches saturation, and their volume therefore increases. This volume increase is remarkable when an organic fuel such as methanol is used in place of water. For example, the volume change that occurs when Nafion (registered trademark), which is a representative perfluorosulfonic acid, is immersed in water is approximately 30%, while the volume change that occurs when it is immersed in methanol is as much as 130%.

That is, when an aqueous solution containing an organic fuel as the fuel is supplied to the anode, the ion exchange resin contained in the anode swells significantly, and its volume therefore increases. Such swelling is more remarkable with an increase in fuel concentration.

The present inventors have found that the deterioration of electrode performance is promoted as follows. First, an uneven fuel concentration inside the electrode leads to an uneven degree of electrolyte swelling, thereby creating a mechanical stress inside the electrode. Further, during a long-term operation of a fuel cell, for example, due to changes in operating conditions such as temperature and current, or at the time of start and stop of the operation, the fuel concentration inside the electrode changes over time, so that the electrolyte repeatedly swells and contracts. The deterioration of electrode performance is promoted by such mechanical stress, repetitive electrolyte swelling and contraction, and combination thereof.

This is described more specifically. During power generation, the fuel concentration of the catalyst layer inside the electrode is highest at the surface in contact with the gas diffusion layer, i.e., the outer surface of the electrode, while it is lowest at the surface in contact with the electrolyte membrane. This is because the fuel is consumed by oxidation reaction inside the electrode, or the fuel migrates to the cathode due to the crossover phenomenon.

Thus, when the relation between power generation and fuel supply is normal, the volume increase is greater in a region of the catalyst layer closer to the gas diffusion layer, while the volume increase is less in a region closer to the electrolyte membrane. However, once the supply-demand relationship of fuel becomes out of balance to cause an excessive fuel supply, the fuel concentration becomes high throughout the interior of the electrode, and the volume increase also increases. This is particularly remarkable when the power generation is stopped with only the fuel being supplied. On the other hand, if the fuel supply is stopped for an extended period of time after the power generation is stopped, the fuel is lost by crossover, so that the fuel concentration inside the electrode gradually decreases and the volume increase of electrolyte also decreases. Also, when the operation is resumed, the fuel concentration that has lowered during the stop of the power generation needs to be heightened rapidly in order to start power generation in a stable manner.

As described above, due to the unevenness of the fuel concentration inside the electrode and the great change in fuel concentration over time, the electrolyte inside the catalyst layer repeatedly swells and contracts, thereby creating a mechanical stress. The mechanical stress breaks the electrolyte network, so that the electrolyte loses its function as a binder inside the electrode. In the worst case, the electrolyte gets separated with catalyst particles from the electrode and discharged with surplus fuel from the fuel cell. Therefore, the proton conductivity inside the electrode lowers to cause an increase in resistance polarization, or the amount of catalyst decreases to cause an increase in reaction resistance. Consequently, the performance of the fuel cell degrades.

BRIEF SUMMARY OF THE INVENTION

It is therefore an object of the present invention to solve the above-mentioned problems, prevent deterioration of anode performance upon a long-term use of a fuel cell, and provide a direct oxidation fuel cell system with an excellent power generation performance.

The present invention provides a membrane electrode assembly for a direct oxidation fuel cell, the assembly including a proton-conductive electrolyte membrane and an anode and a cathode sandwiching the electrolyte membrane. The anode and the cathode have a catalyst layer that comprises a solid proton-conductive substance and a catalyst, and the equivalent weight of the proton-conductive substance contained in the catalyst layer of the anode is greater than the equivalent weight of the proton-conductive substance contained in the catalyst layer of the cathode.

This invention also provides a direct oxidation fuel cell system, including: at least one membrane electrode assembly comprising a proton-conductive electrolyte membrane, and an anode and a cathode sandwiching the electrolyte membrane, the assembly being sandwiched between an anode-side current collector plate and a cathode-side current collector plate; a liquid fuel source in fluid communication with the anode of the at least one membrane electrode assembly; and an oxidant source in fluid communication with the cathode of the at least one membrane electrode assembly. The anode and the cathode have a catalyst layer that comprises a solid proton-conductive substance and a catalyst, and the equivalent weight of the proton-conductive substance contained in the catalyst layer of the anode is greater than the equivalent weight of the proton-conductive substance contained in the catalyst layer of the cathode.

Although the electrolyte contained in the anode catalyst layer is usually the same as the electrolyte contained in the cathode catalyst layer, the present invention is characterized by using electrolytes with different EW values.

It is known that the swelling of a polymer electrolyte upon absorption of liquid is dependent on the amount of liquid absorbed by the polymer electrolyte. With respect to the amount of liquid that can be contained, it is also known that an electrolyte with a small EW value has more acid groups per unit electrolyte than an electrolyte with a large EW value and therefore can contain more liquid.

Accordingly, the smaller the EW value, the greater the electrolyte swelling becomes upon absorption of liquid. This indicates that the electrolyte volume changes greatly (i.e., swells and contracts greatly) depending on the amount of liquid present nearby and the changes in fuel concentration.

In the fuel cell according to the present invention, the anode catalyst layer employs an electrolyte with a relatively large EW value, thereby minimizing the swelling and contraction of the electrolyte caused by changes in operating conditions, repetitive start and stop of operation and the like, and preventing deterioration of electrode performance. On the other hand, the cathode catalyst layer employs an electrolyte with a small EW value, thereby making it possible to maintain high proton conductivity inside the electrode and provide a fuel cell that exhibits an excellent power generation performance.

The present invention employs EW values of electrolyte that are completely opposite to those of the above-mentioned document that is directed to a PEFC that uses hydrogen as the fuel, in order to prevent cathode flooding. In addition, the operational advantages of the present invention are unique to a type of fuel cell in which an organic fuel is supplied to the anode.

In a preferable embodiment of the present invention, the solid proton-conductive substances contained in the catalyst layers of the anode and the cathode are a polymer including perfluorosulfonic acid.

A perfluorosulfonic acid polymer film, typically Nafion (registered trademark), has conventionally been used as the electrolyte membrane of direct oxidation fuel cells such as DMFCs. This substance is characterized by exhibiting very high chemical stability and high proton conductivity.

However, the perfluorosulfonic acid polymer film has a problem in that the so-called crossover phenomenon (permeation of fuel such as methanol through electrolyte membrane) lowers cathode potential and hence fuel utilization efficiency. Thus, the perfluorosulfonic acid polymer film has recently been improved so as to reduce the amount of crossover, for example, by irradiating perfluorosulfonic acid polymer with electron beams to cross-link a part of the polymer. Also, hydrocarbon-type or other electrolyte polymers have been actively developed.

As described above, the problem that the present invention is to solve is that an electrolyte polymer has a property of swelling when absorbing fuel and that the swelling degree changes upon changes in operating conditions and repetitive start and stop of operation, thereby creating a mechanical stress that destroys the structure of the catalyst layer. The present invention intends to prevent this problem.

Therefore, it is presumed that perfluorosulfonic acid polymer whose swelling upon absorption of liquid is significantly greater than that of other electrolyte polymers produces the effects of the present invention most remarkably. However, this property of swelling upon absorption of liquid is inherent in all the electrolyte polymers that exhibit proton conductivity when hydrated. Accordingly, the present invention is not to be construed as being limited to perfluorosulfonic acid polymer.

In a preferable embodiment of the present invention, the equivalent weight EWa of the proton-conductive substance contained in the anode catalyst layer and the equivalent weight EWc of the proton-conductive substance contained in the cathode catalyst layer are 800 to 1200 g/Eq, and the difference between EWa and EWc is not less than 100 g/Eq.

As shown in the following Examples, if the difference between EWa and EWc is at least 100 g/Eq or higher in the EW value range of 800 to 1200 g/Eq of currently available proton-conductive substances, the advantage of the effects of the present invention can be confirmed.

The organic fuel used herein is most preferably methanol.

As mentioned previously, the promising fuel for use in direct oxidation fuel cells is methanol, which has a high theoretical energy conversion efficiency, a smaller reaction overvoltage at the anode than other organic fuels, and a high output. The use of methanol makes it possible to provide a fuel cell that is preferable for the power source for high-energy-density portable electronic appliances.

In a type of fuel cell in which an organic fuel is directly supplied to the anode, the present invention can prevent deterioration of electrode performance caused by electrolyte swelling and contraction upon changes in operating conditions and upon repetitive start and stop of operation, and provide a fuel cell with high power generation performance. Accordingly, it is possible to provide a direct oxidation fuel cell with a long life and a high energy density which is suitable as the power source for portable small-sized electronic appliances and notebook computers.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

Referring now to drawings, the direct oxidation fuel cell and its system according to the present invention are described in detail. The following is merely indicative of one embodiment and is not to be construed as limiting in any way the present invention.

Figure 1:
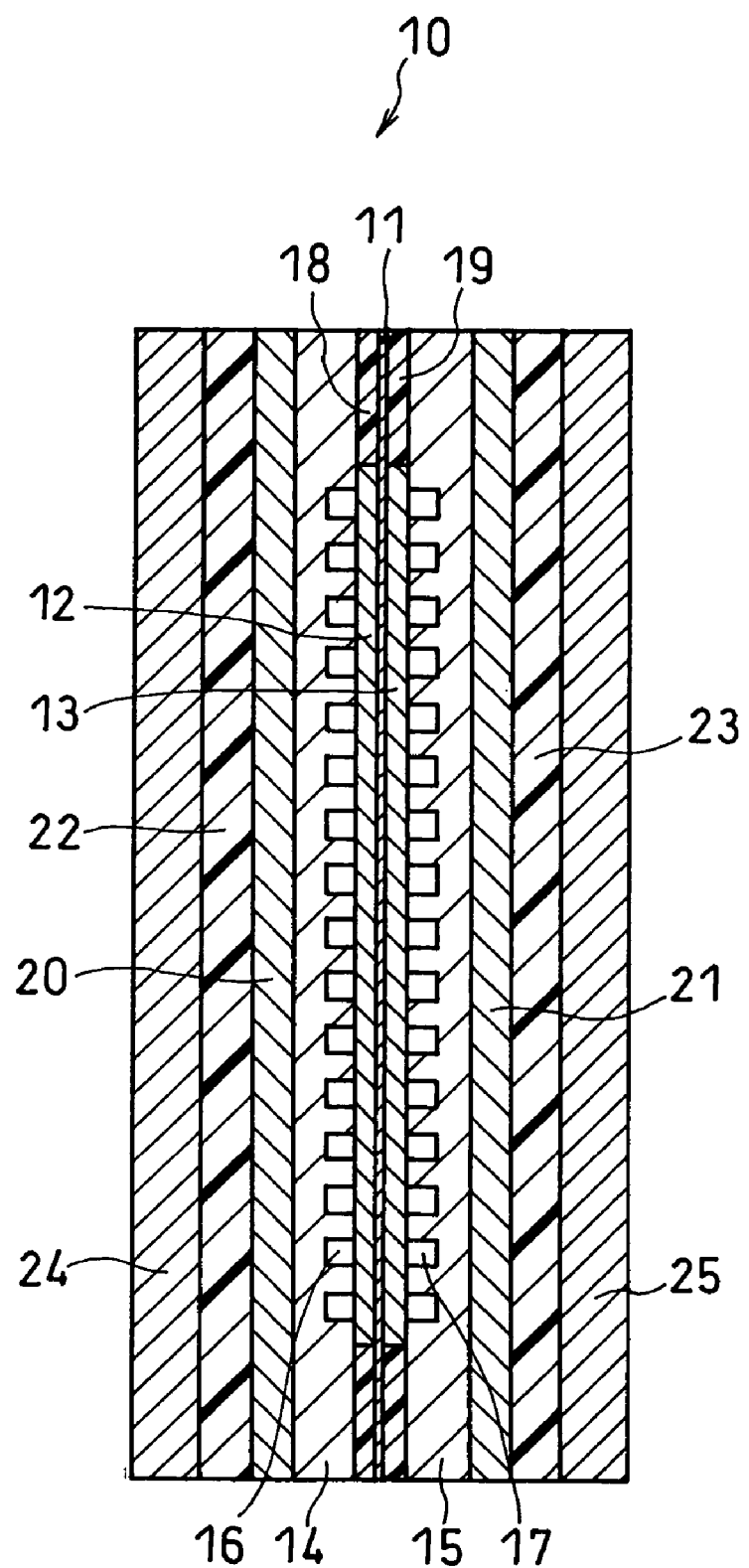
FIG. 1 is a longitudinal sectional view illustrating the schematic structure of a fuel cell in one example of the present invention.

FIG. 1 is a longitudinal sectional view showing the schematic structure of a fuel cell in one example of the present invention.

Numeral 10 represents a fuel cell including a single cell. A membrane electrode assembly (hereinafter "MEA") includes an electrolyte membrane 11, and an anode 12 and a cathode 13 sandwiching the electrolyte membrane 11. The anode and the cathode includes a catalyst layer in contact with the electrolyte membrane and a gas diffusion layer disposed on the outer side of the catalyst layer.

The MEA is sandwiched between an anode-side separator plate 14 and a cathode-side separator plate 15, which have electronic conductivity. The outer periphery of the electrolyte membrane is sandwiched between gaskets 18 and 19. Outside the separator plates 14 and 15 are stacked an anode-side current collector 20 and a cathode-side current collector 21, insulator plates 22 and 23 for electrically insulating the cell from the exterior, and end plates 24 and 25. The entire unit is pressed in the stacking direction and secured with bolts, nuts and springs (not shown).

The anode-side separator plate 14 has, on the anode-facing side, a fuel flow channel 16, composed of a groove, for supplying a fuel to the anode. Likewise, the cathode-side separator plate 15 has, on the cathode-facing side, an oxidant flow channel 17, composed of grooves, for supplying an oxidant to the cathode.

Figure 2:
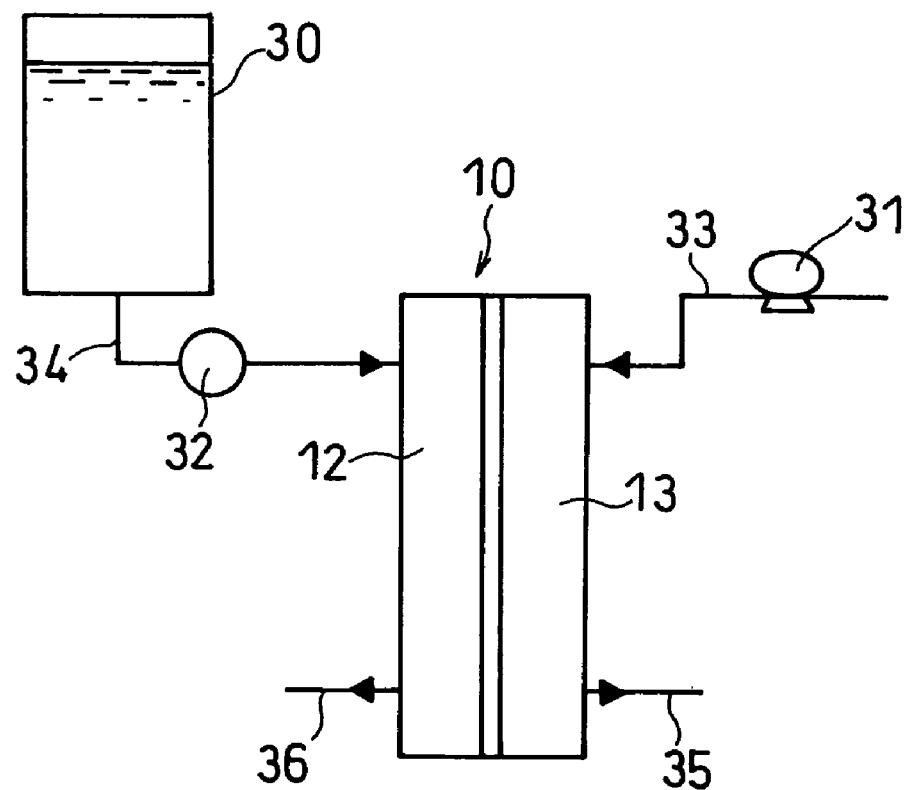
FIG. 2 is a block diagram of a fuel cell system in one example of the present invention.

As illustrated in FIG. 2, the fuel is supplied from a fuel tank 30, through a fuel supply pipe 34 equipped with a pump 32 and an inlet-side manifold of the fuel cell 10, to the inlet of the flow channel 16 and then the anode 12. Residual fuel, water and carbon dioxide are discharged from the outlet of the flow channel 16, through an outlet-side manifold and an exhaust pipe, to the outside. Also, air serving as the oxidant is supplied through a supply pipe 33 equipped with a massflow controller 31 and an inlet-side manifold of the fuel cell 10, to the inlet of the flow channel 17 and then the cathode 13. Residual air and water are discharged from the outlet of the flow channel 17, through an outlet-side manifold and an exhaust pipe 35, to the outside.

Although FIG. 1 shows a single cell, a plurality of cells are often stacked electrically in series to form a stack, since the voltage of a single cell is 1.2 V or less, which is too low to drive an electronic device.

The Examples of the present invention will be described with reference to the use of perfluorosulfonic acid polymer that is currently most common and accessible in obtaining electrolytes with different EW values. However, the concept of using electrolytes with different EW values is also applicable to other electrolyte polymers, and the present invention is not to be limited to the perfluorosulfonic acid polymer.

For example, a polymer designed to reduce methanol crossover absorbs less liquid and hence swells less than perfluorosulfonic acid polymer, but its proton conductivity tends to be inferior to that of perfluorosulfonic acid polymer. Thus, using a polymer that undergoes a small volume change in the anode catalyst layer while using a polymer with a high proton conductivity in the cathode catalyst layer produces the effects of the present invention sufficiently.

Currently commercially available perfluorosulfonic acid polymer electrolytes are in the form of a film or in the form of a dispersion in water or low-molecular weight alcohol. Their EW values are approximately 900 to 1100.

PEFCs, which use hydrogen as the fuel, tend to employ polymer electrolytes with small EW values to obtain high proton conductivity and high ability to absorb water even if the amount of moisture is small. Contrary to this, DMFCs tend to employ polymer electrolytes with high EW values, since high ability to absorb water results in large crossover.

Therefore, it is a conventional practice to employ an electrolyte polymer with an EW value of 1100 g/Eq as the electrolyte in the anode catalyst layer, the electrolyte membrane, and the electrolyte in the cathode catalyst layer, or to employ an electrolyte with an EW value of 1000 or 900 g/Eq as the electrolyte in the catalyst layer of both anode and cathode while employing a polymer with an EW value of 1100 g/Eq as the electrolyte membrane.

On the other hand, the present invention employs, for example, an electrolyte with an EW value of 1100 g/Eq as the electrolyte in the anode catalyst layer and the electrolyte membrane while employing an electrolyte with an EW value of 1000 or 900 g/Eq as the electrolyte in the cathode catalyst layer.

It should be noted that this is merely an example that uses currently available perfluorosulfonic acid polymer electrolytes, and is therefore to be construed as not limiting in any way the present invention. It is also possible to produce polymers with EW values greater than 1100 g/Eq, polymers with EW values less than 900 g/Eq, and polymers with EW values between 1100 g/Eq and 900 g/Eq, if appropriate manufacturing facilities are available. It is therefore possible to use such polymers, and this offers more choices to carry out the present invention, holding the possibility of providing more optimum fuel cells.

As the electrode catalyst, a catalyst powder of noble metal, typically platinum, is used. The catalyst powder is a fine metal powder called "black" in some cases and it is carried on carbon powder in other cases. The anode catalyst includes ruthenium or the like in addition to platinum in a reaction system such as methanol where carbon monoxide is produced as an intermediate product of oxidation process of fuel, in order to reduce poisoning of active sites.

Such a catalyst powder is mixed with a dispersion of electrolyte as described above, and the mixture is applied onto a sheet such as polytetrafluoroethylene (PTFE) and dried. The sheet with the catalyst powder applied thereon is disposed on each side of an electrolyte membrane and bonded to the electrolyte membrane by hot pressing or the like, to form a catalyst layer. Alternatively, a mixture of a dispersion of electrolyte and a catalyst powder is directly applied onto an electrolyte membrane or applied onto a gas diffusion layer. The gas diffusion layer disposed on the outer face of the catalyst layer is usually made of carbon paper or carbon cloth with a high electrical conductivity and a high porosity.

The separator plate is commonly composed of a substance containing a carbon material, such as graphite. The current collector plate is formed of, for example, copper having a small specific resistance, and its surface is often plated with gold to reduce contact resistance.

Examples of the present invention are now described.

Example 1

This example describes a DMFC that uses methanol as the fuel, based on FIG. 1.

First, conductive carbon particles with a mean primary particle size of 30 nm carrying 50% by weight of a platinum-ruthenium alloy in an atomic ratio of 1:1 were used as the anode catalyst powder. The same carbon particles carrying 50% by weight of platinum were used as the cathode catalyst powder.

Next, the anode catalyst powder was mixed with a dispersion of Nafion (Nafion is a registered trademark of E.I. Du Pont de Nemours & Company) with an EW value of 1100 g/Eq, and the resultant mixture was defoamed and formed into a paste. The cathode catalyst powder was mixed with a dispersion of Flemion (Flemion is a registered trademark of Asahi Glass Co., Ltd) with an EW value of 900 g/Eq, and the resultant mixture was defoamed and formed into a paste. In preparing these pastes, the amount of electrolyte was adjusted such that the content of electrolyte in the resultant catalyst layer of each of the anode and the cathode would be 30% by weight. Each of these pastes was applied onto a 50-μm thick polypropylene sheet with a bar coater and then dried at room temperature for 1 day, to form a catalyst layer.

Nafion (registered trademark) 117 (EW value 1100 g/Eq, thickness 7 mil (approximately 0.18 mm)) was sandwiched between the polypropylene sheet with the anode catalyst layer and the polypropylene sheet with the cathode catalyst layer, such that these catalyst layers were positioned inward. This was hot pressed, and the polypropylene sheets were removed therefrom. In this way, the anode catalyst layer was formed on one side of the electrolyte membrane, while the cathode catalyst layer was formed on the other side. Each catalyst layer had the shape of a 5-cm square with an area of 25 $cm^2$.

The same gas diffusion layer was used for the anode and the cathode. Carbon paper (TGP-H-090, available from Toray Industries Inc.) was used as the base material. In order to make the carbon paper water-repellent, the carbon paper was immersed in a diluted tetrafluoroethylene-hexafluoropropylene copolymer (FEP) dispersion (ND-1, available from Daikin Industries, Ltd.) of a predetermined concentration for 1 minute and taken out of the dispersion. Thereafter, the carbon paper was dried in a hot air dryer at 100° C. and then baked in an electric furnace at 270° C. for 2 hours. The FEP content was then 5% by weight.

Next, a paste of a mixture of acetylene black powder and a PTFE dispersion (D-1, available from Daikin Industries, Ltd.) was applied with a bar coater onto the carbon paper subjected to the water-repellent treatment.

A separators was produced by cutting a fuel or air supply flow channel in one face of a 2-mm-thick graphite plate. The fuel flow channel was a serpentine-type flow channel consisting of one groove that curves and winds in a plane of 5-cm square, and the air diffusion flow channel was a parallel-flow type flow channel consisting of a plurality of parallel linear grooves and having no curves. Each flow channel was formed such that its cross-section was 1 mm in both width and depth on both the anode side and the cathode side.

A current collector plate was produced by plating a 2-mm-thick copper plate with gold. Also, an insulator plate made of PTFE was used.

The gas diffusion layer was disposed on the catalyst layer formed on each side of the electrolyte membrane, and then, the separator plate, the current collector plate, the insulator plate, and a 10-mm-thick stainless steel end plate were stacked thereon. The entire unit was secured with bolts, nuts, and springs such that a pressure was applied in the direction perpendicular to the electrolyte membrane, to produce a DMFC. This cell is designated as a cell A.

Example 2

A DMFC was produced in the same manner as in Example 1, except for the use of an electrolyte with an EW value of 1000 g/Eq in an anode catalyst layer. Specifically, a dispersion of Nafion (registered trademark of E.I. Du Pont de Nemours & Company) with an EW value of 1000 g/Eq was used to form an anode catalyst layer. This cell is designated as a cell B.

Example 3

A DMFC was produced in the same manner as in Example 1, except for the use of an electrolyte with an EW value of 1000 g/Eq in a cathode catalyst layer. Specifically, a dispersion of Nafion (registered trademark of E.I. Du Pont de Nemours & Company) with an EW value of 1000 g/Eq was used to form a cathode catalyst layer. This cell is designated as a cell C.

Comparative Example 1

An electrolyte with an EW value of 1100 g/Eq was used in each of anode and cathode catalyst layers. Specifically, a DMFC was produced in the same manner as in Example 1, except for the use of a dispersion of Nafion (registered trademark of E.I. Du Pont de Nemours & Company) with an EW value of 1100 g/Eq to form a cathode catalyst layer. This cell is designated as a cell R1.

Comparative Example 2

An electrolyte with an EW value of 900 g/Eq was used in each of anode and cathode catalyst layers. Specifically, a DMFC was produced in the same manner as in Example 1, except for the use of a dispersion of Flemion (Flemion is a registered trademark of Asahi Glass Co., Ltd.) with an EW value of 900 g/Eq to form an anode catalyst layer. This cell is designated as a cell R2.

In Examples 1 to 3 and Comparative Examples 1 to 2, the initial power generating characteristics and post-long-time-operation power generating characteristics of these DMFCs were compared.

First, the temperature of each cell was controlled at 60° C. with an electric wire heater and a temperature controller.

In order to examine the initial power generating characteristics, each cell was connected to an electronic load unit (PLZ164WA, available form Kikusui Electronics Corporation), and the current density was set to a constant value of 200 mA/cm$^2$. The voltage was recorded 1 minute after the start of power generation. At this time, the internal impedance of each cell was measured with a milliohm meter (MODEL3566, available from Tsuruga Electric Corporation).

A 2 mol/L methanol aqueous solution was used as the fuel, and this was supplied to each cell at a flow rate of 2 cc/min with a tubular pump. Unhumidified air was supplied to the cathode at 1 L/min, using a mass flow controller.

Next, to examine the degree of deterioration in cell characteristics after a long-term operation, each cell was operated first at a current density of 50 mA/cm$^2$ for 5 minutes, then at 200 mA/cm$^2$ for 5 minutes, and then at 300 mA/cm$^2$ for 5 minutes. This cycle was repeated 32 times in a day, i.e., each cell was operated for 8 hours. Thereafter, the operation was stopped.

When the current density is small, the amount of fuel consumed is remarkably small in comparison with the amount of fuel supplied to the anode. It is therefore thought that the fuel concentration in the anode catalyst layer is high and the degree of electrolyte swelling is thus large. Also, when the current density is large, the fuel concentration in the anode catalyst layer is relatively low. It is therefore thought that the degree of electrolyte swelling is small.

Further, immediately after the stop of the operation, the supplied fuel remains in a sufficient amount in the anode catalyst layer, but no fuel is consumed by power generation. It is therefore thought that the fuel concentration in the anode catalyst layer temporarily becomes significantly high, and then, it gradually lowers because of the diffusion of fuel to the cathode by crossover. On the other hand, at the start of operation, in order to increase cell voltage to a certain level, fuel is supplied without generating power. It is therefore thought that the fuel concentration in the anode catalyst layer temporarily becomes significantly high, and then, it lowers after power generation is started.

The above-described operation/stop was repeated for 20 days, and the operation was stopped. Thereafter, each cell was operated again at a current density of 200 mA/cm$^2$, and 1 minute later the voltage and the internal impedance of the cell were measured.

Table 1 shows the data obtained.

TABLE 1

| | Initial Characteristics | | Post long-term-operation characteristics | |
|---|---|---|---|---|
| | Voltage (V) | Impedance (mΩ) | Voltage (V) | Impedance (mΩ) |
| Cell A | 0.35 | 6.7 | 0.35 | 6.8 |
| Cell B | 0.37 | 6.5 | 0.35 | 6.8 |
| Cell C | 0.34 | 7.0 | 0.33 | 7.1 |

TABLE 1-continued

|  | Initial Characteristics | | Post long-term-operation characteristics | |
|---|---|---|---|---|
|  | Voltage (V) | Impedance (mΩ) | Voltage (V) | Impedance (mΩ) |
| Cell R1 | 0.30 | 7.2 | 0.28 | 7.4 |
| Cell R2 | 0.38 | 6.4 | 0.22 | 7.2 |

As shown in Table 1, with respect to the initial characteristics, the use of an electrolyte with a smaller EW value in the cathode catalyst layer resulted in lower internal impedance and better power generating characteristics. Thus, the cell R2 using the electrolyte with the small EW value for both anode and cathode exhibited an excellent performance in the initial characteristics.

On the other hand, with regard to the performance after the long-term operation, the cell R2 exhibited a significant voltage drop and a large impedance increase. In comparison therewith, it has been confirmed that the cells using the electrolyte with the high EW value in the anode catalyst layer exhibited small voltage drop and small impedance increase.

Also, regarding the cell R1 of Comparative Example 1, the deterioration after the long-term operation is equivalent to those of the cells according to the Examples of the present invention. However, since the cell R1 uses the electrolyte with the large EW value in both anode and cathode catalyst layers, its initial power generation performance is lower than those of the cells according to the Examples of the present invention. Accordingly, the cell R1 can be judged as being inferior to the cells according to the present invention.

The above results indicate that the present invention can reduce performance deterioration upon a long-term operation and provide a high output, relative to conventional fuel cells such as those of Comparative Examples.

The fuel cell of the present invention is useful as the power source for portable small-sized electronic devices, such as cellular phones, personal digital assistants (PDA), notebook PCs, and video cameras. Also, it can be applicable to such uses as the power source of electric scooters.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

The invention claimed is:

1. A membrane electrode assembly for a direct oxidation fuel cell, said assembly comprising a proton-conductive electrolyte membrane and an anode and a cathode sandwiching said electrolyte membrane, wherein said anode has an anode catalyst layer that comprises a first mixture of a first solid proton-conductive substance and a first catalyst, said cathode has a cathode catalyst layer that comprises a second mixture of a second solid proton-conductive substance and a second catalyst, and an equivalent weight EWa of the first proton-conductive substance contained in the anode catalyst layer of said anode is greater than an equivalent weight EWc of the second proton-conductive substance contained in the cathode catalyst layer of said cathode wherein the equivalent weight $EW_a$ of the first proton-conductive substance contained in the anode catalyst layer of said anode and the equivalent weight $EW_c$ of the second proton-conductive substance contained in the cathode catalyst layer of said cathode are 800 to 1200 g/Eq, and the difference between $EW_a$ and $EW_c$ is not less than 100 g/Eq.

2. The membrane electrode assembly for a direct oxidation fuel cell in accordance with claim 1, wherein the first and second solid proton-conductive substances comprise a polymer comprising perfluorosulfonic acid.

3. A direct oxidation fuel cell system, comprising:

at least one membrane electrode assembly comprising a proton-conductive electrolyte membrane, and an anode and a cathode sandwiching said electrolyte membrane, said assembly being sandwiched between an anode-side current collector plate and a cathode-side current collector plate;

a liquid fuel source in fluid communication with the anode of said at least one membrane electrode assembly; and an oxidant source in fluid communication with the cathode of said at least one membrane electrode assembly, wherein said anode has an anode catalyst layer that comprises a first mixture of a first solid proton-conductive substance and a first catalyst, said cathode has a cathode catalyst layer that comprises a second mixture of a second solid proton-conductive substance and a second catalyst, and an equivalent weight EWa of the first proton-conductive substance contained in the anode catalyst layer of said anode is greater than an equivalent weight EWc of the second proton-conductive substance contained in the cathode catalyst layer of said cathode wherein the equivalent weight $EW_a$ of the first proton-conductive substance contained in the anode catalyst layer of said anode and the equivalent weight $EW_c$ of the second proton-conductive substance contained in the cathode catalyst layer of said cathode are 800 to 1200 g/Eq, and the difference between $EW_a$ and $EW_c$ is not less than 100 g/Eq.

4. The direct oxidation fuel cell system in accordance with claim 3, wherein the first and second solid proton-conductive substances comprise a polymer comprising perfluorosulfonic acid.

5. The direct oxidation fuel cell system in accordance with claim 3, wherein said liquid fuel source includes methanol.

* * * * *